US011343238B2

(12) United States Patent
Ravi et al.

(10) Patent No.: US 11,343,238 B2
(45) Date of Patent: May 24, 2022

(54) SYSTEM, METHOD, AND APPARATUS FOR VERIFYING A USER IDENTITY

(71) Applicant: Visa International Service Association, San Francisco, CA (US)

(72) Inventors: Abhishek Ravi, Sunnyvale, CA (US); Wei Ying Yap, Singapore (SG); Francois Hribovsek, Singapore (SG); Kok Seng Chew, Singapore (SG)

(73) Assignee: Visa International Service Association, San Francisco, CA (US)

( * ) Notice: Subject to any disclaimer, the term of this patent is extended or adjusted under 35 U.S.C. 154(b) by 32 days.

(21) Appl. No.: 16/754,246

(22) PCT Filed: Oct. 9, 2018

(86) PCT No.: PCT/US2018/054939
§ 371 (c)(1),
(2) Date: Apr. 7, 2020

(87) PCT Pub. No.: WO2019/074882
PCT Pub. Date: Apr. 18, 2019

(65) Prior Publication Data
US 2020/0280557 A1 Sep. 3, 2020

Related U.S. Application Data

(60) Provisional application No. 62/570,209, filed on Oct. 10, 2017.

(51) Int. Cl.
*G06F 7/04* (2006.01)
*G06F 15/16* (2006.01)
*G06F 17/30* (2006.01)
*H04L 29/06* (2006.01)
(Continued)

(52) U.S. Cl.
CPC .......... *H04L 63/0838* (2013.01); *G06F 21/45* (2013.01); *H04L 63/0884* (2013.01)

(58) Field of Classification Search
CPC ............. H04L 63/0838; H04L 63/0884; H04L 9/3228; G06F 21/45
See application file for complete search history.

(56) References Cited

U.S. PATENT DOCUMENTS

2013/0042314 A1   2/2013  Kelley
2013/0073859 A1   3/2013  Carlson et al.
(Continued)

FOREIGN PATENT DOCUMENTS

WO      2017014982 A1    1/2017

*Primary Examiner* — Amie C. Lin
(74) *Attorney, Agent, or Firm* — The Webb Law Firm (57) ABSTRACT

Provided is a computer-implemented method for verifying a user identity, including: receiving, from a user device, authentication data for a user, the authentication data including an account identifier corresponding to an account with a first issuer institution; generating, with at least one processor and based at least partially on the authentication data, a passcode; communicating the passcode to the user device or a second device associated with the user; receiving, with at least one processor, a verification request comprising the passcode; and verifying, with at least one processor, an identity of the user based on validating the passcode.

18 Claims, 4 Drawing Sheets

(51) Int. Cl.
  *H04L 9/40* (2022.01)
  *G06F 21/45* (2013.01)

(56) References Cited

U.S. PATENT DOCUMENTS

| | | | |
|---|---|---|---|
| 2015/0269701 A1* | 9/2015 | Malhotra | G06Q 20/322 |
| | | | 705/325 |
| 2016/0050070 A1 | 2/2016 | Bohli et al. | |
| 2016/0241402 A1 | 8/2016 | Gordon et al. | |
| 2017/0024733 A1* | 1/2017 | Purves | G06Q 20/20 |

* cited by examiner

SYSTEM, METHOD, AND APPARATUS FOR VERIFYING A USER IDENTITY

CROSS-REFERENCE TO RELATED APPLICATIONS

This application is the United States national phase of International Application No. PCT/US2018/054939 filed Oct. 9, 2018, and claims the benefit of U.S. Provisional Application No. 62/570,209, filed on Oct. 10, 2017, the entire content of which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

This disclosure relates generally to user verification and, in non-limiting embodiments, to a system, method, and apparatus for verifying a user identity based on an account identifier.

2. Technical Considerations

Verifying a user's identity can be technically challenging for interested entities, such as banks, merchants, payment gateways, electronic wallets, verification services, and/or the like. Many banks, for example, require verification (e.g., a "know your customer" procedure) for new customers. This often requires the new customer to travel to a physical bank location and provide numerous forms of identification for manual verification. There does not exist a technological architecture to efficiently and effectively allow one entity to verify a user's identity that may have already been verified by another entity.

SUMMARY

In non-limiting embodiments, provided is a computer-implemented method for verifying a user identity, comprising: receiving, from a user device, authentication data for a user, the authentication data comprising an account identifier corresponding to an account with a first issuer institution; generating, with at least one processor and based at least partially on the authentication data, a passcode; communicating the passcode to the user device or a second device associated with the user; receiving, with at least one processor, a verification request comprising the passcode; and verifying, with at least one processor, an identity of the user based on validating the passcode.

In some non-limiting embodiments, the passcode comprises a one-time key. In some non-limiting embodiments, receiving the authentication data comprises: receiving the authentication data from an issuer system corresponding to a second issuer institution, wherein the issuer system initially receives the authentication data from the user device. In some non-limiting embodiments, receiving the verification request comprises receiving the verification request from the issuer system corresponding to the second issuer institution, wherein the issuer system initially receives the verification request from the user device or a second device.

In some non-limiting embodiments, after generating the passcode, the method further comprises communicating at least a portion of the authentication data to an issuer system corresponding to the first issuer institution.

In some non-limiting embodiments, communicating the passcode to the user device or the second device associated with the user comprises communicating the passcode to an issuer system corresponding to the first issuer institution, wherein the passcode is then communicated to the user device or the second device by the issuer system corresponding to the first issuer institution. The method may, in some non-limiting embodiments, further comprise: in response to verifying the identity of the user, generating at least one token or activating at least one token on the user device. In some non-limiting embodiments, the authentication data is received on the user device through an electronic wallet application, the method further comprising: adding a second account identifier to the electronic wallet application in response to verifying the identity of the user. In some non-limiting embodiments, the method further includes generating a verification message in response to verifying the identity of the user; and communicating the verification message to at least one of the following: an issuer system, a payment gateway, a merchant, an electronic wallet system, or any combination thereof.

In non-limiting embodiments, provided is a computer-implemented method for verifying a user identity, comprising: receiving, from a user device associated with a user, a request to apply for an account with a first issuer institution; receiving, from the user device, authentication data for the user, the authentication data comprising an account identifier corresponding to an account with a second issuer institution; generating, with at least one processor and based at least partially on the authentication data, a passcode; communicating the passcode to the user device or a second device associated with the user; receiving, from the user device, a verification request comprising the passcode; verifying, with at least one processor, an identity of the user based on validating the passcode; and communicating a verification message to an issuer system corresponding to the first issuer institution in response to verifying the identity of the user.

In non-limiting embodiments, provided is a computer-implemented method for verifying a user identity, comprising: receiving, from a user device, authentication data for a user, the authentication data comprising an account identifier corresponding to an account with a first issuer institution; verifying, with at least one processor, an identity of the user based on the authentication data; and in response to verifying the identity of the user, communicating a verification message to at least one of the following: an issuer system corresponding to a second issuer institution, a payment gateway, a merchant, an electronic wallet system, or any combination thereof.

In non-limiting embodiments, provided is a system for verifying a user identity, comprising at least one server computer including at least one processor, the at least one server computer programmed or configured to: receive authentication data for a user, the authentication data comprising an account identifier corresponding to an account with a first issuer institution; generate a passcode based at least partially on the authentication data; communicate the passcode to a device associated with the user; receive a verification request comprising the passcode; and verify an identify of the user based on validating the passcode.

In non-limiting embodiments of the system, the passcode comprises a one-time key. In non-limiting embodiments of the system, receiving the authentication data comprises:

receiving the authentication data from an issuer system corresponding to a second issuer institution, wherein the issuer system initially receives the authentication data from the user device. In non-limiting embodiments, receiving the verification request comprises: receiving the verification request from the issuer system corresponding to the second issuer institution, wherein the issuer system initially receives the verification request from the user device or a second device. In non-limiting embodiments, the at least one server computer is further programmed or configured to after generating the passcode, communicate at least a portion of the authentication data to an issuer system corresponding to the first issuer institution.

In non-limiting embodiments of the system, communicating the passcode to the user device or the second device associated with the user comprises: communicating the passcode to an issuer system corresponding to the first issuer institution, wherein the passcode is then communicated to the user device or the second device by the issuer system corresponding to the first issuer institution. In non-limiting embodiments of the system, the at least one server computer is further programmed or configured to in response to verifying the identity of the user, generate at least one token or activating at least one token on the user device. In non-limiting embodiments, the authentication data is received on the user device through an electronic wallet application, and the at least one server computer is further programmed or configured to add a second account identifier to the electronic wallet application in response to verifying the identity of the user. In non-limiting embodiments, the at least one server computer is further programmed or configured to generate a verification message in response to verifying the identity of the user and communicate the verification message to at least one of the following: an issuer system, a payment gateway, a merchant, an electronic wallet system, or any combination thereof.

In non-limiting embodiments, provided is a computer program product for verifying a user identity, comprising at least one non-transitory computer-readable medium including program instructions that, when executed by at least one processor, cause the at least one processor to: receive authentication data for a user, the authentication data comprising an account identifier corresponding to an account with a first issuer institution; generate a passcode based at least partially on the authentication data; communicate the passcode to the user device or a second device associated with the user; receive a verification request comprising the passcode; and verify an identity of the user based on validating the passcode.

In non-limiting embodiments, the program instructions, when executed by the at least one processor, further cause the at least one processor to generate a verification message in response to verifying the identity of the user and communicate the verification message to at least one of the following: an issuer system, a payment gateway, a merchant, an electronic wallet system, or any combination thereof.

In non-limiting embodiments, provided is a computer-implemented method for verifying a user identity, comprising: receiving authentication data for a user, the authentication data comprising a primary account number (PAN) associated with a first issuer institution; generating a passcode in response to receiving the authentication data; receiving a verification request for a user, the verification request comprising the passcode; verifying the identity of the user based at least partially on the verification request; generating a verification message in response to verifying the identity of the user; and communicating the verification message to at least one of the following: an issuer system corresponding to a second issuer institution, a merchant system, a payment gateway, an electronic wallet system, or any combination thereof.

In non-limiting embodiments, provided is a system for verifying a user identity, comprising: (a) a database comprising user account data for a plurality of users, the user account data comprising a plurality of account identifiers corresponding to a plurality of users; and (b) at least one processor programmed or configured to: (i) receive authentication data for a user, the authentication data comprising a PAN associated with a first issuer institution; (ii) generate a passcode in response to receiving the authentication data; (iii) store the passcode in the database in association with the PAN; (iv) receive a verification request for a user, the verification request comprising the passcode; (v) verify the identity of the user based at least partially on the verification request by querying the database with the passcode; (vi) generate a verification message in response to verifying the identity of the user; and (vii) communicate the verification message to at least one of the following: an issuer system corresponding to a second issuer institution, a merchant system, a payment gateway, an electronic wallet system, or any combination thereof.

Further non-limiting embodiments or aspects of the present disclosure will be set forth in the following numbered clauses:

Clause 1: A computer-implemented method for verifying a user identity, comprising: receiving, from a user device, authentication data for a user, the authentication data comprising an account identifier corresponding to an account with a first issuer institution; generating, with at least one processor and based at least partially on the authentication data, a passcode; communicating the passcode to the user device or a second device associated with the user; receiving, with at least one processor, a verification request comprising the passcode; and verifying, with at least one processor, an identity of the user based on validating the passcode.

Clause 2: The computer-implemented method of clause 1, wherein the passcode comprises a one-time key.

Clause 3: The computer-implemented method of clauses 1 or 2, wherein receiving the authentication data comprises: receiving the authentication data from an issuer system corresponding to a second issuer institution, wherein the issuer system initially receives the authentication data from the user device.

Clause 4: The computer-implemented method of any of clauses 1-3, wherein receiving the verification request comprises: receiving the verification request from the issuer system corresponding to the second issuer institution, wherein the issuer system initially receives the verification request from the user device or a second device.

Clause 5: The computer-implemented method of any of clauses 1-4, wherein, after generating the passcode, the method further comprises: communicating at least a portion of the authentication data to an issuer system corresponding to the first issuer institution.

Clause 6: The computer-implemented method of any of clauses 1-5, wherein communicating the passcode to the user device or the second device associated with the user comprises: communicating the passcode to an issuer system corresponding to the first issuer institution, and wherein the passcode is then communicated to the user device or the second device by the issuer system corresponding to the first issuer institution.

Clause 7: The computer-implemented method of any of clauses 1-6, further comprising: in response to verifying the identity of the user, generating at least one token or activating at least one token on the user device.

Clause 8: The computer-implemented method of any of clauses 1-7, wherein the authentication data is received on the user device through an electronic wallet application, the method further comprising: adding a second account identifier to the electronic wallet application in response to verifying the identity of the user.

Clause 9: The computer-implemented method of any of clauses 1-8, further comprising: generating a verification message in response to verifying the identity of the user; and communicating the verification message to at least one of the following: an issuer system, a payment gateway, a merchant, an electronic wallet system, or any combination thereof.

Clause 10: A system for verifying a user identity, comprising at least one server computer including at least one processor, the at least one server computer programmed or configured to: receive authentication data for a user, the authentication data comprising an account identifier corresponding to an account with a first issuer institution; generate a passcode based at least partially on the authentication data; communicate the passcode to a device associated with the user; receive a verification request comprising the passcode; and verify an identity of the user based on validating the passcode.

Clause 11: The system of clause 10, wherein the passcode comprises a one-time key.

Clause 12: The system of clauses 10 or 11, wherein receiving the authentication data comprises: receiving the authentication data from an issuer system corresponding to a second issuer institution, wherein the issuer system initially receives the authentication data from the user device.

Clause 13: The system of any of clauses 10-12, wherein receiving the verification request comprises: receiving the verification request from the issuer system corresponding to the second issuer institution, wherein the issuer system initially receives the verification request from the user device or a second device.

Clause 14: The system of any of clauses 10-13, wherein the at least one server computer is further programmed or configured to: after generating the passcode, communicate at least a portion of the authentication data to an issuer system corresponding to the first issuer institution.

Clause 15: The system of any of clauses 10-14, wherein communicating the passcode to the user device associated with the user comprises: communicating the passcode to an issuer system corresponding to the first issuer institution, wherein the passcode is then communicated to the user device or the second device by the issuer system corresponding to the first issuer institution.

Clause 16: The system of any of clauses 10-15, wherein the at least one server computer is further programmed or configured to: in response to verifying the identity of the user, generate at least one token or activating at least one token on the user device.

Clause 17: The system of any of clauses 10-16, wherein the authentication data is received on the user device through an electronic wallet application, and wherein the at least one server computer is further programmed or configured to add a second account identifier to the electronic wallet application in response to verifying the identity of the user.

Clause 18: The system of any of clauses 10-17, wherein the at least one server computer is further programmed or configured to: generate a verification message in response to verifying the identity of the user; and communicate the verification message to at least one of the following: an issuer system, a payment gateway, a merchant, an electronic wallet system, or any combination thereof.

Clause 19: A computer program product for verifying a user identity, comprising at least one non-transitory computer-readable medium including program instructions that, when executed by at least one processor, cause the at least one processor to: receive authentication data for a user, the authentication data comprising an account identifier corresponding to an account with a first issuer institution; generate a passcode based at least partially on the authentication data; communicate the passcode to a user device or a second device associated with the user; receive a verification request comprising the passcode; and verify an identity of the user based on validating the passcode.

Clause 20: The computer program product of clause 19, wherein the program instructions, when executed by the at least one processor, further cause the at least one processor to: generate a verification message in response to verifying the identity of the user; and communicate the verification message to at least one of the following: an issuer system, a payment gateway, a merchant, an electronic wallet system, or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider. A token service may include one or more computer systems and/or applications for generating tokens corresponding to user accounts issued by one or more issuer institutions.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "user device" may refer to one or more electronic devices configured to communicate with one or more networks. As an example, a user device may include a desktop computer, cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), a POS system, a network-capable appliance (e.g., a television, automobile, wash machine, thermostat, refrigerator, etc.), and/or other like devices.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the system and method for verifying a user's identity leverage a user's portable financial device, such as a credit card, to verify the user's identity (e.g., a "know your customer" process). Issuer institutions, merchants, payment gateways, verification providers, and other entities may use non-limiting embodiments to verify a user's identity through communication with a transaction service provider. For example, a user may verify himself or herself through a user device by entering a PAN or other account identifier. The user device communicates authentication data including the PAN or other account identifier to a remote system, such as a transaction processing server and/or token service. The remote system then verifies the user's identity and communicates a verification message to a requesting entity. In some non-limiting embodiments, for example, the remote system generates a passcode in response to receiving the authentication data and communicates the passcode to the user device or some other user device. The user may then verify himself or herself by inputting the passcode. Through a unique arrangement and flow of messages between the user device and remote system, non-limiting embodiments provide for a secure way to efficiently authenticate a user that improves the speed and security of existing methods and systems for verifying a user's identity.

Figure 1:
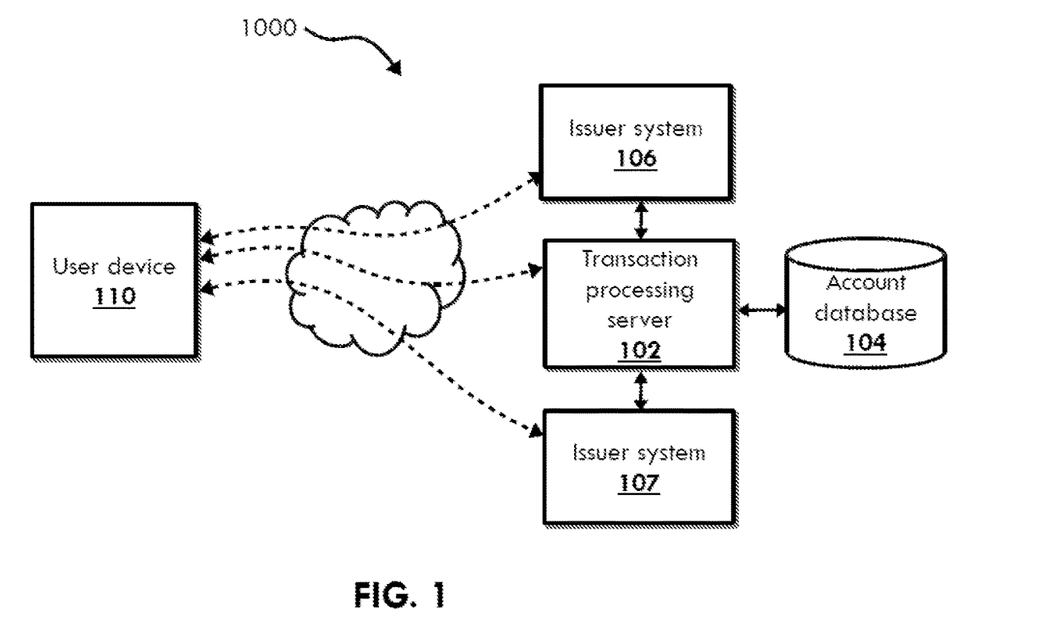
FIG. 1 is a schematic diagram of a system for verifying a user's identity according to non-limiting embodiments.
Figure 2A:
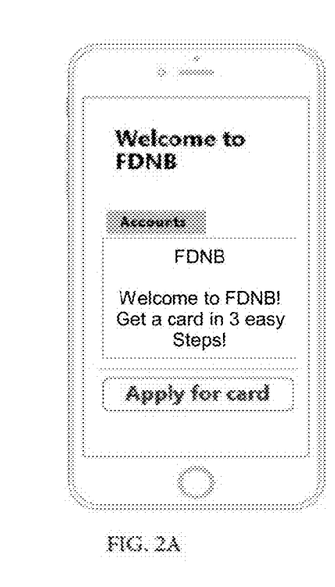
FIGS. 2A-2D are graphical user interfaces (GUIs) of a system for verifying a user's identity according to non-limiting embodiments.
Figure 2B:
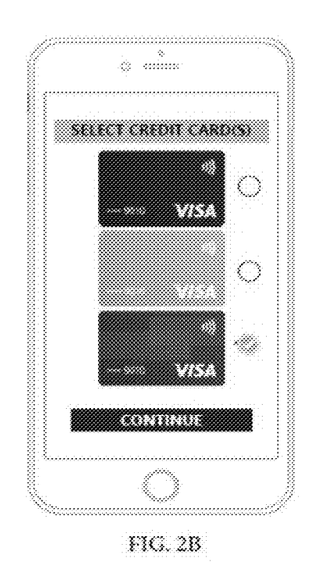
Figure 2C:
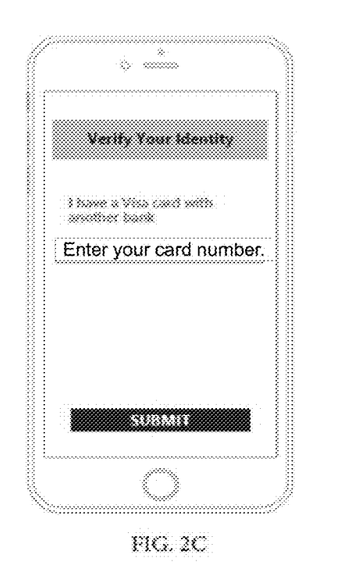
Figure 2D:
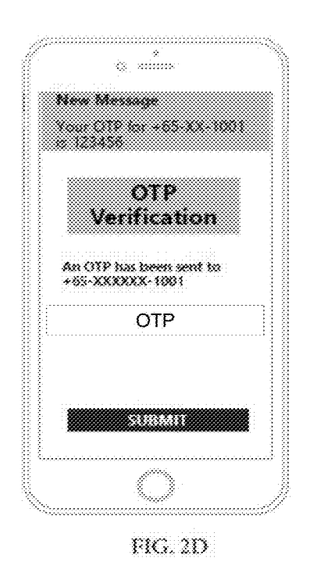

Referring now to FIG. 1, a system 1000 for verifying a user's identity is shown according to non-limiting embodiments. A user device 110 is in communication with a transaction processing system 102 through a network environment, such as the Internet. The transaction processing system 102 is in communication with a first issuer system 106 corresponding to a first issuer institution and a second issuer system 107 corresponding to a second issuer institution. The transaction processing system 102 is also in communication with an account database 104 that includes user account data. The user device 110 may communicate with the transaction processing system 102 directly or, in other examples, through a payment gateway, acquirer institution, issuer institution, merchant system, electronic wallet system, and/or the like. In non-limiting embodiments, the transaction processing system 102 may include or be in communication with a token service (not shown separately in FIG. 1).

With continued reference to FIG. 1, in non-limiting examples, a user may wish to verify his or her identity with the second issuer institution (corresponding to issuer system 107) to apply for an account. It will be appreciated, however, that a user may verify his or her identity for any entity or for any reason. The user of user device 110 in this example has an account with the first issuer institution (corresponding to issuer system 106). The user inputs an account identifier associated with the account issued by the first issuer institution into the user device 110. As an example, the user may input a PAN or token for the account into the user device 110. The user device 110, e.g., an application and/or hardware on the user device 110, may then generate authentication data based on the account identifier. The authentication data may, for example, include the account identifier itself or an identifier derived from the account identifier. The transaction processing system 102 may then generate a passcode and store the passcode in the account database 104 in association with the user (e.g., in association with the user's PAN, token, name, unique identifier, and/or the like). The transaction processing system 102 may also communicate the passcode to the user device 110 or some other user device.

In the continued example of a user applying for an account with the second issuer institution (corresponding to issuer system 107), the transaction processing system 102 may communicate the passcode to the user by first communicating the passcode to the issuer system 106 corresponding to the first issuer institution. The issuer system 106 may then communicate the passcode to the user device 110. It will be appreciated that other variations are possible. The user may then input the passcode into the user device 110 or some other device (e.g., a merchant system, a second user device, and/or the like). A verification request may then be generated and communicated to the transaction processing system 102 based on the passcode (e.g., including the passcode itself or data derived from the passcode). In some examples, the user device 110 may generate the verification request and communicate it to the issuer system 107 corresponding to the second issuer institution (e.g., the issuer institution to which the user is applying for an account). The issuer system 107 may then verify the identity of the user by communicating with the transaction processing system 102. For example, the issuer system 107 may communicate a verification request including the passcode to the transaction processing system 102. The transaction processing system 102, in response to verifying the user's identity (e.g., determining that the user's identity is correct or incorrect), may communicate a verification message to the issuer system 106, issuer system 107, user device 110, and/or any other system or device.

Referring to FIGS. 2A-2D, graphical user interfaces (GUIs) are shown according to non-limiting embodiments in which a system and method for verifying a user identify is used to sign-up for a new account. A user applies for an account on a first GUI 202 and second GUI 204. For example, on the first GUI 202, the user may choose to apply for an account through a selectable option. On the second GUI 204, the user may select one of a plurality of account types to apply for. The user inputs an account identifier on a third GUI 206 shown in FIG. 2C and receives a passcode in response (shown as a push notification over a fourth GUI 208 shown in FIG. 2D). The fourth GUI 208 includes an input field for the user to input the passcode. It will be appreciated that the GUIs may take on any number of forms. Moreover, although the GUIs in FIGS. 2A-2D are shown on mobile devices, it will be appreciated that they may be presented on any display device.

Figure 3:
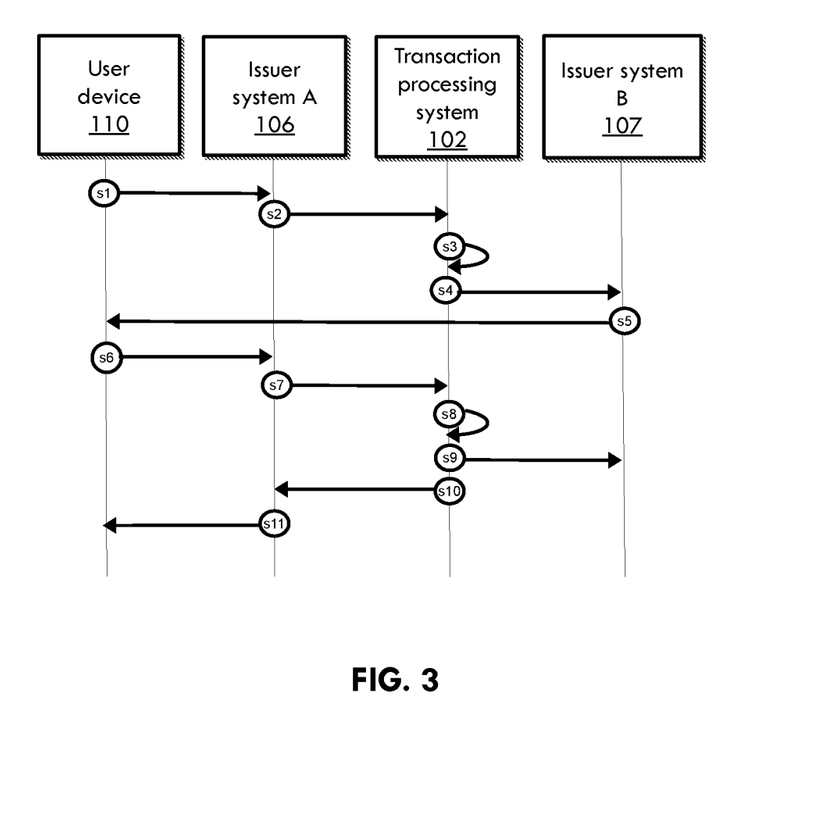
FIG. 3 is a sequence diagram for a non-limiting example in which a user is applying for an account with Issuer A, already has an existing account with Issuer B, and seeks to verify himself or herself to Issuer A with an account identifier corresponding to Issuer B.

FIG. 3 illustrates a sequence diagram for a non-limiting example in which a user is applying for an account with Issuer A (corresponding to Issuer system A 106), already has an existing account with Issuer B (corresponding to Issuer system B 107), and seeks to verify himself or herself to Issuer A with an account identifier issued by Issuer B. At a first step s1, the user device communicates an authentication request to Issuer system A 106 including authentication data, such as a PAN issued by Issuer B. At step s2, the Issuer system A 106 communicates an authentication request to the transaction processing system 102 such as, but not limited to, an authentication subsystem and/or token service thereof. At step s3, the transaction processing system generates a passcode, such as a random one-time passcode, and stores the passcode in association with the user (e.g., in association with the user's PAN, token, name, unique identifier, and/or the like).

With continued reference to FIG. 3, at step s4 the transaction processing system 102 communicates the passcode to the Issuer system B 107. At step s5, Issuer system B 107 communicates the passcode to the user device 110 such as, but not limited to, through a mobile application of the Issuer system B 107, an electronic wallet application, a text message, a push notification, an email, a phone call, and/or the like. At step s6, the user device communicates the passcode to the Issuer system A 106 to verify the user. The passcode may be communicated to the Issuer system A 106 at step s6 through a GUI (e.g., webpage, mobile application, etc.), push notification, prompt, text message, or by any other method. The Issuer system A 106 uses the passcode to verify the user. Accordingly, at step s7, the Issuer system A 106 communicates a validation request including the passcode to the transaction processing system 102.

Still referring to FIG. 3, at step s8, the transaction processing system 102 validates the passcode. For example, for non-limiting embodiments in which a one-time passcode is generated based on a predetermined set of parameters of transaction data, the one-time passcode may be recreated at step s8 based on the same parameters and the same input data. The passcodes may then be compared to determine if they match, thereby determining whether the passcode is valid and verifying the user's identity in response to a match (e.g., in response to determining that the passcode is valid).

At steps s9 and s10, a notification message is communicated to the Issuer system B 107 and Issuer system A 106. The notification message may include data representing a status of the verification request, such as a verified status or a rejected status. At step s11, in response to receiving the notification message from the transaction processing system 102, the Issuer system A 106 communicates a notification to the user device 110 to inform the user of the status.

Figure 4:
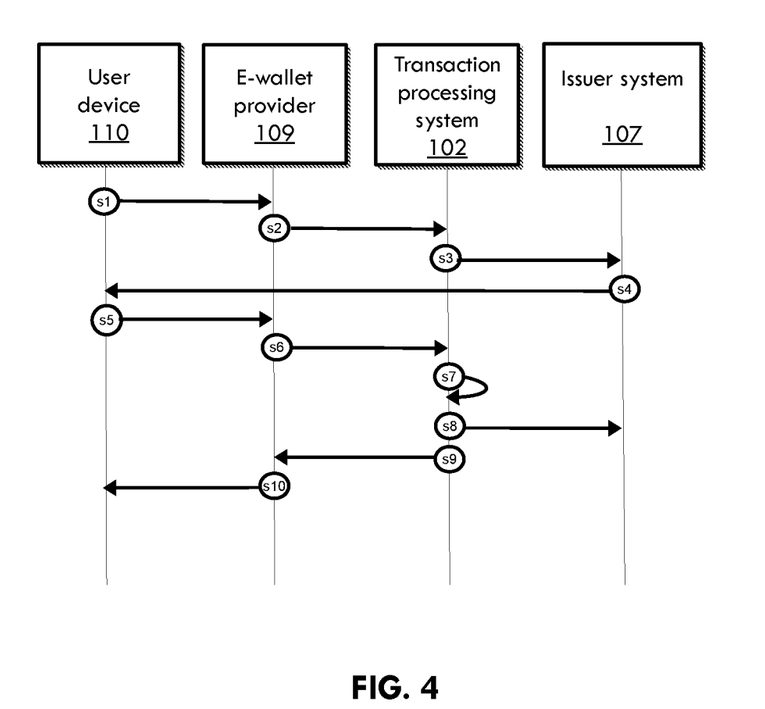
FIG. 4 is a sequence diagram for a method of generating and validating a passcode for verifying a user's identity according to non-limiting embodiments.

FIG. 4 illustrates a sequence diagram for a method of generating and validating a passcode for verifying a user's identity according to non-limiting embodiments. The electronic wallet provider 109 in FIG. 4 may be any entity with which the user is seeking to verify his or her identity such as, but not limited to, a payment gateway, merchant, issuer institution, and/or any other entity. In non-limiting embodiments, a user may verify his or her identity with the electronic wallet provider 109 to add a token corresponding to a payment card to an electronic wallet. It will be appreciated that one or more application programming interfaces (APIs) may be provided to facilitate interaction and communication between issuer systems, the transaction processing system, electronic wallet providers, merchant systems, client devices, and/or the like. In some non-limiting embodiments, existing APIs for communicating between the transaction processing system and the issuer systems may be modified and/or enhanced to facilitate user verification according to the non-limiting embodiments described herein.

With continued reference to FIG. 4, at a first step s1, the user device 110 communicates a selection of a passcode delivery method (e.g., text message, email, phone call, push notification, and/or the like) to the electronic wallet provider 109 or another entity. At step s2, the electronic wallet provider 109 communicates the passcode delivery method to the transaction processing system 102 such as, but not limited to, an authentication subsystem and/or token service thereof. At step s3, the transaction processing system 102 generates a passcode and communicates it to issuer system 107 corresponding to the user's account. At step s4, the issuer system 107 communicates the passcode to the user device 110 based on the selected delivery method.

Still referring to FIG. 4, at step s5 the user device 110 communicates the passcode to the electronic wallet provider 109. For example, a user may input the passcode into the electronic wallet application on the user device 110 or into a website associated with the electronic wallet provider 109. The electronic wallet provider 109 at step s6 communicates the passcode to the transaction processing system 102 for validation. The transaction processing system 102 validates the passcode as described herein at step s7. At step s8, if the passcode is validated at step s6, the transaction processing system 102 and/or token service communicates a notification (e.g., an 0620 OTP notification or any other type of notification) to the issuer system 107 to indicate that the passcode was validated. At step s9, the transaction processing system 102 and/or token service communicates an activate token message to the electronic wallet provider 109 in response to validating the passcode. At step s10, the electronic wallet provider 109, in response to receiving the activate token message, causes the activation of a token on the user device 110.

Non-limiting embodiments of systems and methods for verifying a user's identity may be used for various purposes. For example, a user may verify his or her identity on an e-commerce platform to make a purchase (e.g., using a card-on-file for the payment), through an electronic wallet and/or wearable device (e.g., to add a token or other payment instrument to the device), and/or through a separate authentication platform for utilizing one or more services (e.g., access to a website, registration for an application or service, etc.). Further, in non-limiting embodiments, systems and methods for verifying a user's identify may be used in place of existing systems and methods that require a zero or nominal value payment authorization for verifying a user's identify. Moreover, in some non-limiting embodiments, issuer institutions may require new customers to verify their identities through the systems and methods described herein.

Although non-limiting embodiments have been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for verifying a user, comprising:
   receiving, by at least one computing system from a user device via an issuer system corresponding to a second issuer institution, authentication data for the user, the authentication data comprising a primary account number corresponding to an account with a first issuer institution, wherein the issuer system initially receives the authentication data from the user device and transmits the authentication data to the at least one computing system, and wherein the at least one computing system is separate and remote from the user device and the issuer system;
   generating, with the at least one computing system and based at least partially on the authentication data, a passcode;
   communicating the passcode to the user device or a second device associated with the user;
   receiving, with the at least one the computing system, a verification request comprising the passcode; and
   verifying, with the at least one computing system, an identity of the user based on validating the passcode.

2. The computer-implemented method of claim 1, wherein the passcode comprises a one-time key.

3. The computer-implemented method of claim 1, wherein receiving the verification request comprises: receiving the verification request from the issuer system corresponding to the second issuer institution, wherein the issuer system initially receives the verification request from the user device or the second device.

4. The computer-implemented method of claim 3, wherein, after generating the passcode, the method further comprises: communicating at least a portion of the authentication data to an issuer system corresponding to the first issuer institution.

5. The computer-implemented method of claim 1, wherein communicating the passcode to the user device or the second device associated with the user comprises: communicating the passcode to an issuer system corresponding to the first issuer institution, and wherein the passcode is then communicated to the user device or the second device by the issuer system corresponding to the first issuer institution.

6. The computer-implemented method of claim 1, further comprising: in response to verifying the identity of the user, generating at least one token or activating at least one token on the user device.

7. The computer-implemented method of claim 1, wherein the authentication data is received on the user device through an electronic wallet application, the method further comprising: adding a second account identifier to the electronic wallet application in response to verifying the identity of the user.

8. The computer-implemented method of claim 1, further comprising:
   generating a verification message in response to verifying the identity of the user; and
   communicating the verification message to at least one of the following: an issuer system, a payment gateway, a merchant, an electronic wallet system, or any combination thereof.

9. A system for verifying a user, comprising at least one server computer including at least one processor, the at least one server computer programmed or configured to:
   receive authentication data for the user from a user device via an issuer system corresponding to a second issuer institution, the authentication data comprising a primary account number corresponding to an account with a first issuer institution, wherein the issuer system initially receives the authentication data from the user device and transmits the authentication data to the at least one server computer, and wherein the at least one server computer is separate and remote from the user device and the issuer system;
   generate a passcode based at least partially on the authentication data;
   communicate the passcode to the user device or a second device associated with the user;
   receive a verification request comprising the passcode; and
   verify an identity of the user based on validating the passcode.

10. The system of claim 9, wherein the passcode comprises a one-time key.

11. The system of claim 9, wherein receiving the verification request comprises: receiving the verification request from the issuer system corresponding to the second issuer institution, wherein the issuer system initially receives the verification request from the user device or the second device.

12. The system of claim 11, wherein the at least one server computer is further programmed or configured to: after generating the passcode, communicate at least a portion of the authentication data to an issuer system corresponding to the first issuer institution.

13. The system of claim 9, wherein communicating the passcode to the user device associated with the user comprises: communicating the passcode to an issuer system corresponding to the first issuer institution, wherein the passcode is then communicated to the user device or the second device by the issuer system corresponding to the first issuer institution.

14. The system of claim 9, wherein the at least one server computer is further programmed or configured to: in response to verifying the identity of the user, generate at least one token or activating at least one token on the user device.

15. The system of claim 9, wherein the authentication data is received on the user device through an electronic wallet application, and wherein the at least one server computer is further programmed or configured to add a second account identifier to the electronic wallet application in response to verifying the identity of the user.

16. The system of claim 9, wherein the at least one server computer is further programmed or configured to:
generate a verification message in response to verifying the identity of the user; and
communicate the verification message to at least one of the following: an issuer system, a payment gateway, a merchant, an electronic wallet system, or any combination thereof.

17. A computer program product for verifying a user, comprising at least one non-transitory computer-readable medium including program instructions that, when executed by at least one processor, cause the at least one processor to:
receive authentication data for the user from a user device via an issuer system corresponding to a second issuer institution, the authentication data comprising a primary account number corresponding to an account with a first issuer institution, wherein the issuer system initially receives the authentication data from the user device and transmits the authentication data to the at least one processor, and wherein the at least one processor is separate and remote from the user device and the issuer system;
generate a passcode based at least partially on the authentication data;
communicate the passcode to a user device or a second device associated with the user;
receive a verification request comprising the passcode; and
verify an identity of the user based on validating the passcode.

18. The computer program product of claim 17, wherein the program instructions, when executed by the at least one processor, further cause the at least one processor to:
generate a verification message in response to verifying the identity of the user; and
communicate the verification message to at least one of the following: an issuer system, a payment gateway, a merchant, an electronic wallet system, or any combination thereof.

* * * * *